United States Patent [19]

Noorlander

[11] Patent Number: 4,459,939

[45] Date of Patent: Jul. 17, 1984

[54] DISPOSABLE INNER SLEEVE FOR INFLATION ASSEMBLY

[76] Inventor: Daniel O. Noorlander, 508 West 630 South, Orem, Utah 84057

[21] Appl. No.: 400,739

[22] Filed: Jul. 22, 1982

[51] Int. Cl.³ .............................................. A01J 5/04
[52] U.S. Cl. ................................................. 119/14.49
[58] Field of Search ............... 119/14.47, 14.48, 14.49, 119/14.50, 14.51, 14.52, 14.53

[56] References Cited

U.S. PATENT DOCUMENTS 1,308,082  7/1919  Koch et al. ...................... 119/14.52

FOREIGN PATENT DOCUMENTS 784008  10/1957  United Kingdom ............. 119/14.49

*Primary Examiner*—Hugh R. Chamblee
*Attorney, Agent, or Firm*—Terry M. Crellin

[57] ABSTRACT

A teat cup assembly is disclosed incorporating a novel inner shell and associated molded inflation member which can be inserted within an outer metal shell. The invention can be used to provide inexpensive, discardable inner shells and inflations for use with existing, conventional, stainless steel outer shells which are in common use in the dairy industry throughout the world. This permits the dairyman to take advantage of new, improved, molded inflations made of superior materials such as silicone rubber without the expense involved in replacing the costly stainless steel teat cup shells of his existing milking apparatus.

7 Claims, 3 Drawing Figures

DISPOSABLE INNER SLEEVE FOR INFLATION ASSEMBLY

BACKGROUND OF THE INVENTION

Field

The invention pertains to improved teat cup assemblies and, in particular, to the practical utilization of recently improved inflations, and especially to inflations made of silicone rubber, with the metal shells of more conventional milking apparatus.

State of the Art

Conventional automatic milking machines utilize teat cup assemblies including a hollow, rigid, metal outer shell which is usually made of stainless steel. The metal outer shell has a port which is adapted to be attached to a pulsating vacuum line, and a resilient, tubular liner or inflation is provided extending longitudinally of the the metal outer shell. An annular vacuum chamber is formed between the shell and the inflation, with the pressure in the annular chamber being alternated between subatmospheric pressure and a higher pressure, typically atmospheric, by the pulsating vacuum line attached to the shell. A constant vacuum line is connected to the lower end of the inflation to draw milk from the animal's teat which is received in the upper end of the inflation. The interior of the inflation is, thus, maintained at a constant subatmospheric pressure, and the alternating pressure in the annular chamber periodically forces the walls of the inflation inwardly resulting in a massaging action on the teat as well as collapsing the walls of the inflation below the teat to periodically relieve the teat from exposure to the vacuum in the constant vacuum line.

It is important that the upper portion of the inflation grips the teat firmly to prevent vacuum loss and disengagement of the teat cup from the teat, as well as to prevent the teat cups from moving higher up on the teats during pulsations of the milking machines, which can otherwise alternately result in constriction of the teat and premature shut off of milk from the udder even though the udder is only partially emptied. Improved inflations, such as shown in my prior art patents, i.e., U.S. Pat. Nos. 3,659,557 and 3,096,740, teat cup assemblies are provided in which the inflation is molded so as to integrally incorporate a resilient diaphragm and an opening means therein at the teat entrance portion of the inflation. Other inflations which are molded so as to incorporate a resilient retaining element integrally therein are disclosed in U.S. Pat. Nos. 2,744,496; 3,771,494 and 3,873,521.

In a later patent of mine, U.S. Pat. No. 4,315,480, and in a copending application of mine, Ser. No. 391,168 filed June 23, 1982, improved teat cup assemblies are disclosed in which an inflation and a separately molded teat entrance member are made of silicone rubber which is not subject to deterioration due to soil, fat, ozone, etc. Inflations made of silicone rubber have been found to have a much greater life than inflations made of conventional rubber and other moldable elastomeric materials. Specially designed shells and caps were provided to protect the silicone rubber parts from puncture-type damage to which the silicone rubber is particularly vulnerable.

Objectives

A principal objective of the present invention is to provide an inflation and inner shell assembly which is adapted to utilize an inflation made of the more desirable silicone rubber material and which can be inserted into an outer shell such as the existing stainless steel shells used in conventional prior art milking machines. A further objective is to provide an inexpensive inflation and inner shell assembly which can be readily inserted into an outer metal shell such as the existing stainless steel shells of conventional prior art milking machines.

SUMMARY OF THE INVENTION

The above objectives are achieved in accordance with the present invention by forming a novel, inexpensive, discardable inner shell and inflation assembly which utilizes improved inflations and in particular molded inflations made of silicone rubber. The inner shell is preferably molded from a rigid, synthetic resin or plastic material. The inner shell is adapted to fit longitudinally within an outer shell such as the stainless steel shells commonly used in teat cup assemblies of prior art milking machines.

A raised cylindrical band is provided at the upper end of the inner shell, preferably being molded integrally with the inner shell, to form an annular shoulder around the upper end of the inner shell. The raised cylindrical band is of a size such that the shoulder formed thereby abuts the open upper end of the outer shell when the inner shell is positioned longitudinally within the outer shell. An inwardly directed flange is integrally attached at the lower end of the inner shell. The flange is preferably molded integrally with the inner shell.

An elongate tubular inflation made of a resilient flexible, elastomeric material, preferably silicone rubber, is adapted to be received longitudinally within the tubular shell. A head member is molded integerally to the upper end of the inflation member. The head member comprises a diaphragm positioned across the otherwise open upper end of the inflation member. The diaphragm has a central opening therein which is adapted to receive the teat of an animal to be milked. The head member also includes a substantially cylindrical side section which extends from the perimeter of the diaphragm so as to be spaced from the upper end of the inflation member. The cylindrical side section is adapted to fit over the raised cylindrical band at the upper end of the inner shell when the inflation member is positioned within the inner shell.

An elongate hollow nipple is inserted in the lower end of the inflation member, such that flow communication is provided to the inflation through the nipple. The nipple is also adapted to seal the lower end of the inflation member to the lower end of the inner shell. When the inflation is positioned within the inner shell, with the cylindrical side section of the head of the inflation engaging raised cylindrical band at the upper end of the inner shell and with the lower end of the inflation sealed to the lower end of the inner shell, the inner shell, the inflation and the nipple become a unitary assembly which can easily and readily be inserted in the metal shells commonly used in the teat cup assemblies of the prior art milking machines.

After the inner shell and inflation assembly of this invention has been inserted longitudinally into the outer metal shell, a cup member can be slidingly engaged over the head member of the inflation and a portion of the upper end of the outer shell so as to securely hold the upper end of the inner shell and inflation assembly of this invention in place adjacent to the upper end of the outer shell. The free end of the nipple at the lower end of inner shell and inflation assembly projects from a corresponding opening in the lower end of the outer shell, and means which are well known in the art can be used to seal the portion of the nipple adjacent the opening to outer shell.

The assembled teat cup assembly is then used in well known manner, with the nipple extending from the outer shell being connected to the constant vacuum milk line of a milking machine and with the port in the side of the outer shell being connected to the source of pulsating pressure. The teat cup assembly is readily cleaned after use, without requiring disassembly of the teat cup. When the inflation becomes worn at the end of its useful life (the useful life of the silicone rubber inflations being much greater than that of conventional rubber inflations), the teat cup is quickly and easily disassembled, and the inner shell and worn inflation are discarded. A new inner shell and inflation assembly is then replaced in the outer shell unit, and the assembled unit is ready for further use.

Additional objects and features of the invention will become apparent from the following detailed description, taken together with the accompanying drawings.

THE DRAWINGS

A preferred embodiment of the present invention representing the best mode presently contemplated of carrying out the invention is illustrated in the accompanying drawings, in which.

DETAILED DESCRIPTION OF THE ILLUSTRATED EMBODIMENT

Figure 1:
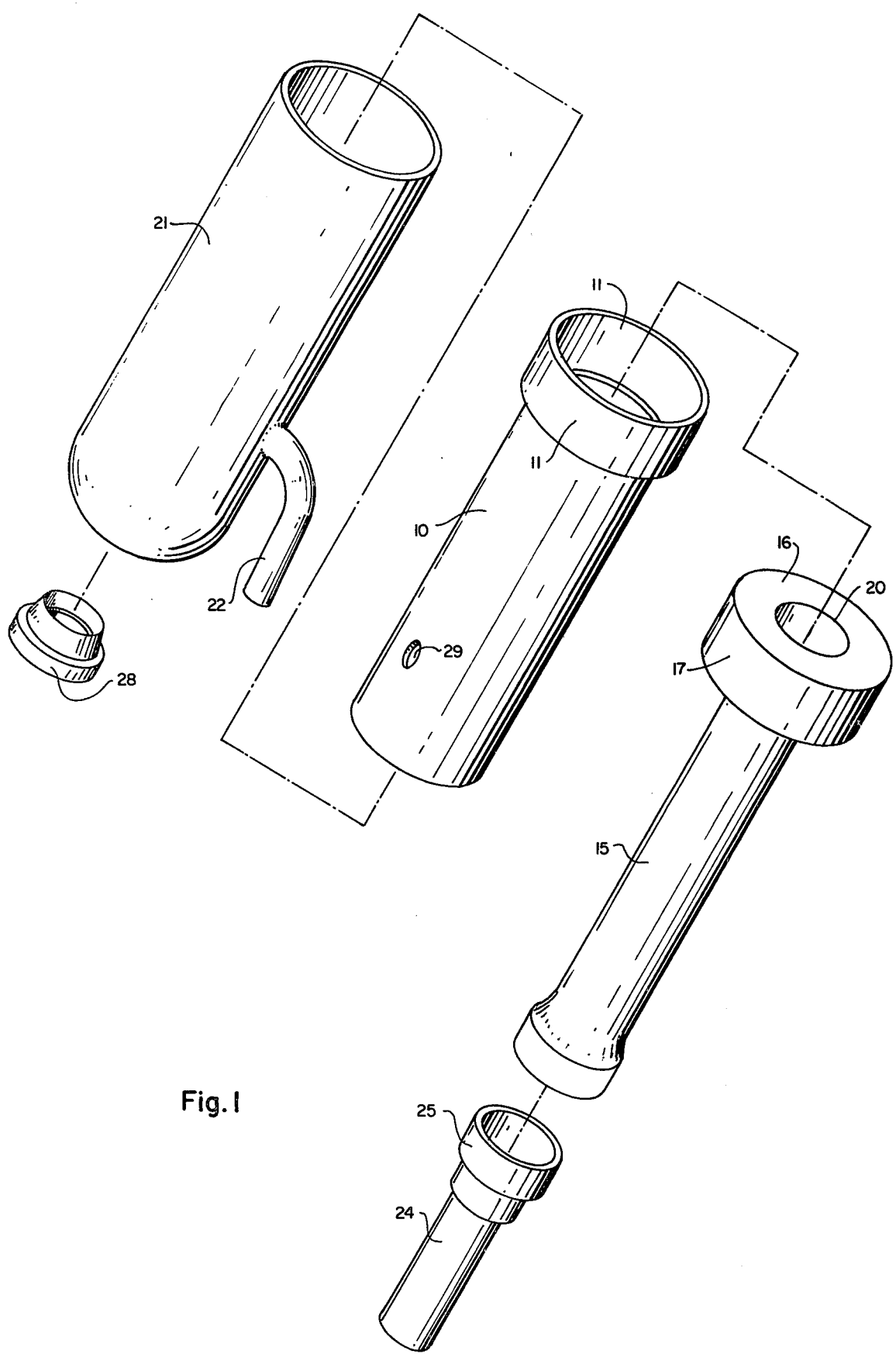
FIG. 1 is an exploded perspective of an embodiment of the inner shell and inflation assembly of this invention as it is installed in an outer metal shell, such as a stainless steel shell commonly used in teat cup assemblies of prior art milking machines.
Figure 2:
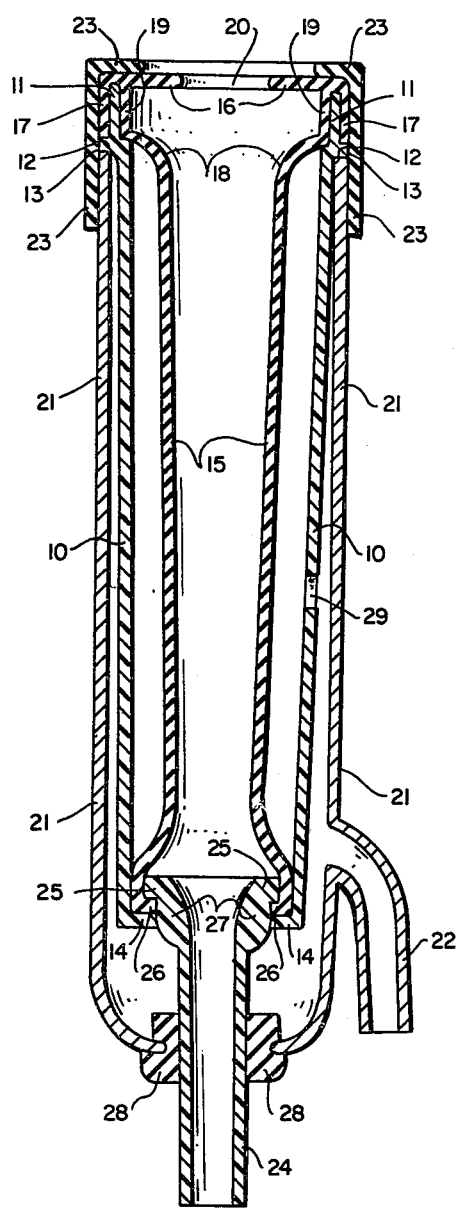
FIG. 2 is a vertical cross section through the assembled apparatus shown in FIG. 1.
Figure 3:
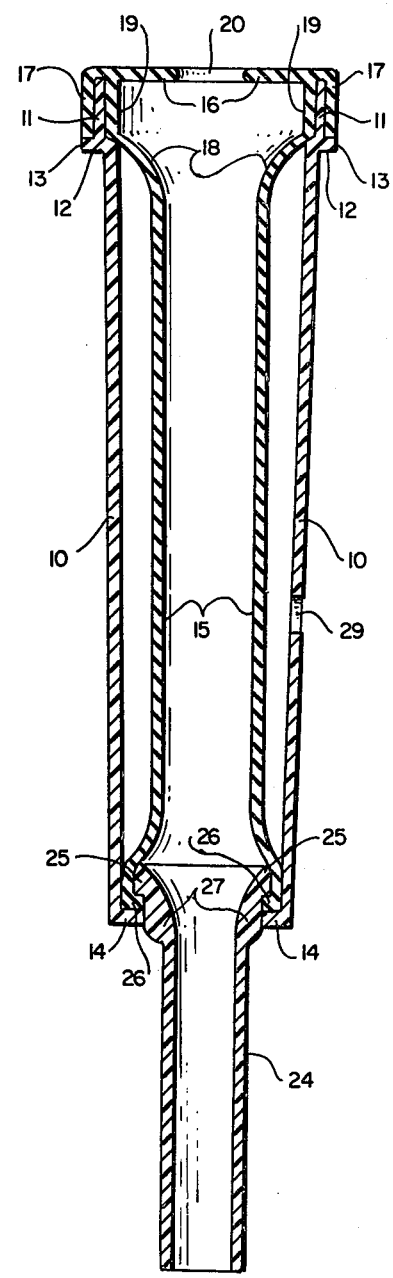
FIG. 3 is a vertical cross section through the isolated inner shell and inflation assembly of the invention.

A preferred embodiment of a teat cup assembly in accordance with the present invention is shown in the drawings. In FIGS. 1 and 2 a complete teat cup assembly is shown including the outer metal shell. In FIG. 3, the novel inner shell and inflation assembly of the invention is shown isolated from the outer metal shell of the complete teat cup assembly.

As illustrated, the novel inner shell and inflation comprises an inner elongate, tubular, rigid shell 10. The shell 10 preferably has a circular cross section; however, the shell 10 could have a cross section of a convex polygon of any number of sides. Of course, as the number of sides in a shell having a polygonal cross section increases, the shell approaches having a round, cylindrical shape. The rigid, tubular shell 10 is preferably molded from a synthetic resin or plastic material such as nylon, acrylic, methacrylic, polyvinyl chloride, polycarbonate, polyethylene, polypropylene, acrylonitrile, styrene or polysulfone, among others.

A raised cylindrical band 11 is attached to the upper end of the inner shell 10 so as to form a seal around the perimeter of the upper end of the shell 10 and to form an annular shoulder 12 around the upper end of the shell 10. The cylindrical band 11 is of a substantially circular cross section. The thickness of the raised band 11 must either be sufficient for the inner surface thereof to be adjacent to and to make contact and seal with the upper end of the shell 10, or an annular flange must extend integrally from the end of the raised band to make contact and seal with the upper end of the shell 10. In the preferred, illustrated embodiment, the raised band 11 has a flange at its lower end which extends to the inside as well as the outside of the band 11. The protruding outer portion 13 of the flange will be utilized as described hereinafter. The inner portion of the flange is attached to and seals the raised band 11 to the upper end of the shell 10. An inwardly directed flange 14 is integrally attached at the lower end of the inner shell 10. The flange 14 is preferably molded integrally with the shell 10.

An elongate, tubular inflation 15 is received longitudinally within the inner shell 10. The inflation member 15 is molded from a resilient, flexible elastomeric material, preferably silicone rubber. Silicone rubber inflations have much greater useful lives than conventional rubber inflations and other moldable elastomeric materials. The silicone rubber is further resistant to deterioration due to soil, fat, ozone, chemicals used in cleaning the inflations, etc. The surface of the silicone rubber inflations are essentially free of cracks, crevices and other surface irregularities which can otherwise provide a habitat for growth and propegation of detrimental bacteria. Further, because of the resistance to deterioration, the silicone rubber inflations remain substatially free of such surface throughout the useful lives of the inflations.

The longitudinal sides of the inflations 15 can be molded so as to have various cross-sectional shapes as are well known in the art. Preferably, the inflations 15 are molded with a round, oval or triangular cross section. Irrespective of the cross-sectional shape of the longitudinal sides of the inflation 15, a substantially cylindrical head member is molded integrally to the upper end of the inflation 15. The head member comprises a diaphragm 16 which is positioned across the otherwise open upper end of the inflation 16. The head member further includes a substantially cylindrical side section 17 which extends downwardly from the perimeter of the diaphragm 16. The inside surface of the side section 17 is spaced from the outer surface of the upper end of the inflation member 15, so that the cylindrical side section 17 is adapted to fit telescopically over the raised cylindrical band 11 at the upper end of the inner shell 10 when the inflation 15 is positioned longitudinally within the inner shell 10. As illustrated, the longitudinal sides of the inflation 15 will preferably have a cross-sectional size substantially smaller than the cylindrical space within the inner shell, and a curved transition section 18 is molded in the inflation 15 which connects the inflation 15 to the head member. As shown, the curved transition section 18 leads to a cylindrical section 19 which in turn is connected to the diaphragm 16. The side section 17 of the head member extends downward from the diaphragm 16 in coaxial spaced arrangement with the cylindrical section 19, and when the inflation 15 is positioned within the inner shell 10, the cylindrical band is received into the space between the side section 17 and the cylindrical section 19. The longitudinal dimensions of the side section 17 and the cylindrical section 19 are substantially the same and correspond to the longitudinal dimension of the cylindrical band 11. The joint between the transition section 18 and the cylindrical section 19 preferably abuts the ledge formed at the top of the inner shell 10 and the inside, lower edge of the cylindrical band 11. The lower end of the side section 17 of the head member extends downwardly and preferably abuts the upper edge of the ledge formed by the outer portion 13 of the flange on band 11.

The diaphragm 16 is provided with a central opening 20 which is adapted to receive the teat of an animal to be milked. The central opening 20 is preferably located substantially coaxial with the longitudinal axis of inflation 15. The opening 20 has a substantially circular shape, and the circumference of the opening 20 is somewhat smaller than the cross-sectional circumference of the main body portion of the inflation 15. The opening 20 is, thus, adapted to make firm contact with the teat of the animal to be milked, and the contact between the teat and the opening 20 is sufficient to prevent the teat cup assembly from falling off the teat during the latter stages of the milking period. The supple resiliency of the diaphragm 16 allows the teat cup to be used on teats of various sizes without causing damage to the teats.

As illustrated in FIGS. 2 and 3, in a preferred embodiment of the invention, the diaphragm is molded such that the teat engaging surface at the circumference of the opening 20 is formed with a smooth circular shape. Advantageously, a smooth torus is provided around the perimeter of the opening 20. Although not illustrated, the torus can have a diameter which is slightly greater than the thickness of the diaphragm 16 as is taught in my U.S. Pat. No. 4,315,480. The smooth circular shape of the opening 20 has been found to be ideally adapted to engage the teat of an animal to be milked with firm yet gentle contact.

The inner shell 10 and inflation 15 assembly is received longitudinally within a rigid, tubular, outer shell 21. The outer shell 21 has a substantially open upper end and a curved bottom having a circular opening therein. A port 22 is provided along the longitudinal length of the outer shell 21, with the port 22 being adapted to be connected to a source of pulsating vacuum.

The tubular inner shell 10 is adapted to fit longitudinally within the outer shell 21 from the upper end of the outer shell 21, so that an annular space is formed between the outer surface of the inner shell 10 and the inner surface of the outer shell 21. The annular shoulder 12 formed by the cylindrical band 11 is adapted to abut the open upper end of the outer shell 21 when the inner shell 10 is positioned longitudinally within the outer shell 21. The cylindrical band 11 then extends substantially coaxially outwardly from the open end of the outer shell 21.

The upper end of the inner shell 10 and inflation 15 assembly is held securely in position at the open end of the outer shell 21 by a substantially cylindrical cap member 23 which is adapted to slide substantially tightly over the head member of the inflation 15 and a portion of the upper end of the outer shell 21. The cap member 23 also provides protection for the elastomeric head member portion of the inflation 15. The cap member 23 is preferably made of a tough, resilient elastomeric plastic material of sufficient thickness to provide a protective cover for the cylindrical side section 17 of the head member and to tightly fit over the head member and a portion of the upper end of the outer shell 21.

The outer shell 21 is generally made of metal. As mentioned previously, the inner shell 10 and inflation 15 assembly is advantageously used with an outer shell 21 comprising a stainless steel shell conventionally used in prior art milking machines. The inner shell assembly is inexpensive and can be used with the more expensive stainless steel outer shells 21 of the prior art apparatus, so as to minimize the expense incurred in adapting the prior art teat cup assemblies for use with improved inflations made of superior materials such as silicone rubber.

The lower ends of the inner shell 10 and the inflation 15 are sealed together so as to form an annular chamber between the inner shell 10 and the inflation 15. The means for sealing the lower ends of the inner chamber 10 and inflation 15 comprises an elongated, hollow, cylindrical nipple 24 having an enlarged cylindrical band 25 at the upper end of the nipple 24. The inner or downward end of the enlarged band 25 forms an annular abutment about the nipple 24 between the enlarged band 25 and the nipple 24. The band 25 has a substantially circular perimeter which is adapted to fit snugly within the lower end of the inflation 15. An inwardly directed, annular lip 26 is integrally molded to the lower end of the inflation 15 and is adapted to engage the annular abutment formed about the nipple 24 by the band 25. The nipple 24 is preferably molded in a unitary piece from any of the materials mentioned hereinbefore from which the inner shell 10 can be molded.

In the illustrated embodiment, there is an enlarged annular section 27 on the upper portion of the nipple 24 adjacent to the raised band 25 and the abutment formed by the raised band 25. The opening formed by the interior edge of the flange 14 on the lower end of the inner shell 10 is adapted to fit snugly over the enlarged annular section 27 of the nipple 24. The lip 26 on the lower end of the inflation and a portion of the lower end of the inflation are locked and held securely in place between the flange 14 and the lower inside end surface of the shell 10 on the outside of the inflation and the raised band 25, the abutment formed by the raised band 25 and the annular section 27 on the inside of the inflation. Preferably, the inner edge of the flange 14 of the shell 10 is firmly attached with an appropriate adhesive to the nipple 24 at the enlarged section 27 so that the inner shell 10, inflation 15 and nipple 24 are connected in a unified assembly as shown in FIG. 3.

The unified inner shell 10 and inflation 15 assembly, as shown in FIG. 3, is then adapted to be received longitudinally within the outer shell 21 as explained hereinabove and as shown in FIG. 2. When the inner shell 10 and inflation 15 assembly are positioned within the outer shell 21, means are provided for sealing the portion of the nipple 24 to the opening in the lower end of the shell 21 from which the distal portion of the nipple 24 extends. As illustrated a bushing or grommet 28 is adapted to fit tightly over the distal end of the nipple 24 and to further make a compression-type engagement with the opening in the lower end of the outer shell 10.

The upper end of the inner shell 10 and inflation 15 assembly is sealed to the upper end of the outer shell 21 by the cap member 23 as explained hereinbefore. Thus, a pulsating vacuum chamber is formed between the inner shell 10 and the outer shell 21, when the port 22 on the outer shell 21 is connected to a source of pulsating vacuum. The pulsating vacuum chamber between the inner and outer shells 10 and 21 is in fluid flow communication with the chamber formed between the inner shell 10 and the inflation through an aperture or opening 29 in the sidewall of the inner shell 10. Thus, the pulsating vacuum introduced through the port 22 in the outer shell reacts with the inflation 15 to produce the desired massaging motion in the sidewall of the inflation 15. The portion of the nipple 24 which extends from the outer shell 21 is adapted to be connected to a milk line which is maintained at a constant vacuum.

Although a preferred embodiment of the apparatus of the invention has been illustrated and described, it is to be understood that the present disclosure is made by way of example and that various other embodiments are possible without departing from the subject matter coming within the scope of the following claims, which subject matter is regarded as the invention.

I claim:

1. A teat cup assembly for automatic milking machines of the type which employs a milk line operating at substantially constant vacuum and a source of pulsating vacuum, said teat cup assembly comprising:
   a rigid, tubular, outer shell having a substantially open upper end, a port positioned along the longitudinal length thereof and an opening at the lower end thereof, said port being adapted to be connected to the source of pulsating vacuum;
   a rigid, elongate, tubular inner shell adapted to fit longitudinally within said outer shell from the open upper end of said outer shell, with an annular space being formed between the outer surface of said inner shell and the inner surface of said outer shell, said inner shell having at least one aperture therein along the longitudinal length thereof;
   an annular shoulder around the upper end of said inner shell, said shoulder being adapted to abut the open upper end of said outer shell when the inner shell is fit longitudinally within said outer shell;
   a cylindrical band securely attached to the upper end of said inner shell adjacent to said annular shoulder, with said cylindrical band extending substantially coaxially outwardly from the open end of said outer shell;
   an elongate tubular inflation member made of a resilient flexible elastomeric material, said inflation member being adapted to be received longitudinally within said tubular shell;
   a head member molded integrally to the upper end of said inflation member, said head member comprising a diaphragm positioned across the otherwise open upper end of said inflation member and a substantially cylindrical side section which extends from the perimeter of said diaphragm so as to be spaced from the upper end of said inflation member, whereby said cylindrical side section is adapted to fit over the raised cylindrical band at the upper end of said inner shell when said inflation member is positioned with said inner shell, said diaphragm having a central opening therein adapted to receive the teat of an animal to be milked;
   means for sealing the lower end of said inflation to said inner shell so as to form a chamber between said inflation and said inner shell;
   means associated with the lower end of said inflation and extending from the open, lower end of said outer shell for connecting a milk line in fluid flow communication with said inflation;
   means for sealing the open, lower end of said outer shell to said means associated with the lower end of said inflation; and
   a substantially cylindrical cap member which is adapted to slide substantially tightly over the head member and a portion of the upper end of said outer shell so as to securely hold the head member and the upper end of said inner shell in place adjacent to the upper end of said outer shell.

2. A teat cup assembly in accordance with claim 1, wherein the means for sealing the lower end of said inflation to said inner shell, and the means connected to the lower end of said inflation, and the means for sealing the opening at the lower end of said outer shell to said means connected to the lower end of said inflation comprises:
   an inwardly directed flange securely attached at the lower end of said inner shell;
   an inwardly directed, annular lip securely attached at the lower end of said inflation member;
   an elongate, hollow nipple having an enlarged band at the upper end thereof, with the inner end of said enlarged band forming an annular abutment about said nipple between said band and said nipple, said enlarged band having a perimeter which is adapted to fit snugly within the lower end of said inflation member, with the annular lip of said inflation member engaging said annular abutment on said nipple, said nipple being further adapted to extend from the lower end of said inflation and through the opening in the lower end of said outer shell when the inner shell and inflation are positioned within said outer shell;
   means for sealing the inwardly facing edge of the flange on the lower end of said inner shell to said nipple when the inflation and nipple are received longitudinally within said inner shell, such that the annular lip of said inflation is held securely between the annular abutment on said nipple and the inwardly directed flange on the lower end of said inner shell; and
   means for forming a seal between said nipple and the perimeter of the opening in the lower end of said outer shell through which the free end of the nipple projects.

3. A teat cup assembly in accordance with claim 2, wherein said tubular inflation, said head member and said inwardly directed, annular lip are molded as an integral unit from silicone rubber.

4. A teat cup assembly in accordance with claim 2, wherein said inner shell, said raised band and said inwardly directed flange are molded as an integral unit from a moldable, rigid, plastic material.

5. An inner shell and inflation assembly for insertion within the outer shell of a teat cup assembly for automatic milking machines of the type which employ a milk line operating at substantially constant vacuum and a source of pulsating vacuum, said inner shell and inflation assembly comprising:
   a rigid, elongate, tubular inner shell having at least one aperture in the sidewall thereof;
   an annular flange or cylindrical band securely attached to the upper end of said inner shell to form an annular shoulder around the upper end of said inner shell;
   an elongate tubular inflation member made of a resilient, flexible elastomeric material, said inflation member being adapted to be received longitudinally within said tubular shell;
   a head member molded integrally to the upper end of said inflation member, said head member comprising a diaphragm positioned across the otherwise open upper end of said inflation member and a substantially cylindrical side section which extends from the perimeter of said diaphragm so as to be spaced from the upper end of said inflation member, whereby said cylindrical side section is adapted to fit over the raised cylindrical band at the upper end of said inner shell when said inflation member is positioned within said inner shell, said diaphram having a central opening therein adapted to receive the teat of an animal to be milked;

an inwardly directed flange securely attached at the lower end of said inner shell;

an inwardly directed annular lip securely attached at the lower end of said inflation member;

an elongate, hollow nipple having an enlarged band at the upper end thereof, with the inner end of said enlarged band forming an annular abutment about said nipple between said band and said nipple, said enlarged band having a perimeter which is adapted to fit snugly within the lower end of said inflation member, with the annular lip of said inflation member engaging said annular abutment on said nipple; and means for sealing the inwardly facing edge of the flange on the lower end of said inner shell to said nipple when the inflation and nipple are received longitudinally within said inner shell, such that the annular lip on said inflation is held securely between the annular abutment on said nipple and the inwardly directed flange on the lower end of said inner shell.

6. An inner shell and inflation assembly in accordance with claim 5, wherein said tubular inflation and said head member are molded as an integral unit from silicone rubber.

7. An inner shell and inflation assembly in accordance with claim 5 wherein said inner shell and said raised band are molded as an integral unit from a moldable, rigid, plastic material.

* * * * *